United States Patent
Schuchardt et al.

(10) Patent No.: US 10,095,795 B2
(45) Date of Patent: Oct. 9, 2018

(54) CONTENT PROVISIONING SYSTEM FOR WEARABLE TECHNOLOGY DEVICES

(71) Applicant: SAP SE, Walldorf (DE)

(72) Inventors: Katja Schuchardt, Mannheim (DE); Raimund Gross, Nussloch (DE); Olaf Beier, Mannheim (DE)

(73) Assignee: SAP SE, Walldorf (DE)

( * ) Notice: Subject to any disclaimer, the term of this patent is extended or adjusted under 35 U.S.C. 154(b) by 323 days.

(21) Appl. No.: 14/957,176

(22) Filed: Dec. 2, 2015

(65) Prior Publication Data

US 2017/0161387 A1 Jun. 8, 2017

(51) Int. Cl.
| | | |
|---|---|---|
| *G06F 17/30* | (2006.01) | |
| *H04L 29/08* | (2006.01) | |
| *G06F 1/16* | (2006.01) | |
| *G06Q 30/02* | (2012.01) | |
| *H04W 4/02* | (2018.01) | |
| *H04W 4/80* | (2018.01) | |

(52) U.S. Cl.
CPC ........ *G06F 17/30867* (2013.01); *G06F 1/163* (2013.01); *G06Q 30/0261* (2013.01); *H04L 67/18* (2013.01); *H04L 67/22* (2013.01); *H04L 67/26* (2013.01); *H04L 67/306* (2013.01); *H04W 4/023* (2013.01); *H04W 4/80* (2018.02)

(58) Field of Classification Search
CPC ................................................ G06F 17/30867
See application file for complete search history.

(56) References Cited

U.S. PATENT DOCUMENTS

| | | | | |
|---|---|---|---|---|
| 7,933,395 | B1 * | 4/2011 | Bailly | G06F 3/04815 379/201.04 |
| 8,635,216 | B1 * | 1/2014 | Hepworth | G06F 17/30867 706/12 |
| 8,770,477 | B2 * | 7/2014 | Hefetz | G06Q 20/32 235/380 |
| 2009/0192987 | A1 * | 7/2009 | Loeser | G06F 17/30241 |
| 2009/0265222 | A1 * | 10/2009 | Chatani | G06Q 30/02 705/7.29 |
| 2010/0013603 | A1 * | 1/2010 | Chatani | G06Q 30/02 340/10.6 |

(Continued)

OTHER PUBLICATIONS

Internet article, entitled "Android Studio Overview," retrieved from: http://developer.android.com/tools/studio/index.html, Accessed at Jan. 13, 2015; printed on Dec. 2, 2015.

(Continued)

*Primary Examiner* — Syed H Hasan
(74) *Attorney, Agent, or Firm* — Fountainhead Law Group P.C.

(57) ABSTRACT

Embodiments relate to an improved system and method for provisioning content for users of wearable technology devices. This solution combines the advantages of wearable devices, being mobile and present for customers, with the need to stay well informed about products or services. The embodiments can be configured to push updated information, promotions, or alerts to users. The information can include information about a product or service, or performance targets, or performance metrics. Such information can be provisioned to users on-demand or based on the occurrence of one or more triggering events, and can be accomplished without distracting the user from one or more other tasks or daily routines. The content provided to the wearable technology users can also be curated based on user profile information.

20 Claims, 13 Drawing Sheets

(56) References Cited

U.S. PATENT DOCUMENTS

| | | | | |
|---|---|---|---|---|
| 2010/0062746 | A1* | 3/2010 | Proctor, Jr. | G06Q 30/0623 455/411 |
| 2011/0260922 | A1* | 10/2011 | Zhang | G01S 5/0252 342/451 |
| 2012/0117145 | A1* | 5/2012 | Clift | G06F 9/4445 709/203 |
| 2015/0018011 | A1* | 1/2015 | Mendelson | G01C 21/206 455/456.3 |
| 2015/0363806 | A1* | 12/2015 | Lee | G06O 30/0206 705/7.31 |
| 2017/0064609 | A1* | 3/2017 | Park | H04L 12/189 |
| 2017/0124511 | A1* | 5/2017 | Mueller | G06Q 10/0837 |

OTHER PUBLICATIONS

Internet article, entitled "Git-fast-version-control", retrieved from: http://git-scm.com/, Accessed at Jan. 13, 2015; printed on Dec. 2, 2015.

Internet article, entitled "XE22.0 Release Notes",https://support.google.com/glass/answer/6106048?hl=en&reftopic=6106047, Accessed at Jan. 13, 2015; printed on Dec. 2, 2015.

Internet article, entitled "Activity", retrieved from: http://developer.android.com/reference/android/app/Activity.html, Accessed at Jan. 16, 2015; Dec. 1, 2015.

Internet article, entitled "Now the Business App is Personal," retrieved from: http://hcp.sap.com/index.html, Accessed at Jan. 20, 2015.

WebSocket Protocol, RFC 6455, 2011.

WebSocket API, W3C, Editor: Ian Hickson, Google, Inc., 2011.

Internet article, entitled "Maximize the value of our SAP solution with advanced end-user training", http://www.sap.com/wpb, Accessed at Jan. 19, 2015. Printed on Dec. 2, 2015.

Internet article, entitled "BarcodeEye, Port of Androids version of ZXing library app to Google Glass," retrieved from: https://github.com/BarcodeEye/BarcodeEye, Accessed at Jan. 13, 2015; printed on Dec. 2, 2015.

* cited by examiner

CONTENT PROVISIONING SYSTEM FOR WEARABLE TECHNOLOGY DEVICES

TECHNICAL FIELD

At least certain embodiments disclosed herein relate generally to data processing in a computer network, and more particularly to a system and method for provisioning content for wearable technology devices.

BACKGROUND

Wearable technology devices are worn on a user's body and can be characterized as always on and accessible when activated. Wearable technology user adoption is forecasted to increase dramatically over the next several years. This increase is largely driven by an increase in sales of premium smart watches, smart glasses, and other wearable technology devices. As a result, this new class of technologies has gained increased attention from businesses and enterprise software developers.

The potential for applications of wearable technology in the workplace is considerable. One idea is to explore the use of wearable technology devices to help support and optimize the workforce in industry. Educating the workforce continues to be a challenge faced by businesses, governmental agencies, and other organizations. Providing a workforce with specific, relevant, and up-to-date information to enable workers to make decisions can substantially increase workforce productivity. Therefore it would be advantageous to utilize wearable technology devices to facilitate provisioning of relevant information to users of these devices to increase knowledge and influence behaviors.

SUMMARY

The embodiments described herein include improved systems and methods for provisioning content for wearable technology devices. In a first embodiment, a method is disclosed comprising receiving, at a server computer, a notification indicating a wearable client device is within a threshold proximity of a physical site of multiple physical sites via an open communications channel between the server computer and the wearable client device, matching the notification received from the wearable client device with an item of content including an identification of the item of content, communicating a first query to a database system for first content objects relating to the item of content, and receiving a first query response from the database system including the first content objects.

The method further comprises correlating the first content objects with user profile information of a user of the wearable client device to obtain first curated content, selecting one or more of the first content objects based on a role of the user of the wearable client device to obtain first curated content, and pushing the first curated content to the wearable client device using an electronic communications module operable to maintain the open communications channel between the server computer and the wearable client device. A proximity sensor device can be associated with to the first physical site and can include a sensor identification tag.

In one example embodiment, the method may further include listening for content requests from the wearable client device over a second communications channel separate from the open communications channel between the server computer and the wearable client device, receiving a request from the wearable client device for one or more second content objects via the second communications channel, communicating a second query to the database system to obtain the requested second content objects, receiving a second query response from the database system including the second content objects, correlating the second content objects with the user profile information of the user of the wearable client device to obtain second curated content, and communicating a response to the request from the wearable client device including the second curated content via the second communications channel.

In one embodiment, a wearable client application on the wearable client device may be configured to detect when the wearable client device is within the threshold proximity of the proximity sensor device, and to communicate the notification to the server computer. In such an embodiment, the notification may comprise a token sent to the computer server from a wearable client application on the wearable client device. In another embodiment, the notification indicating the wearable client device is within the threshold proximity of the first physical site may comprise the sensor identification tag sent to the computer server from the proximity sensor device.

In one embodiment the method may further include receiving an update to an item of content comprising one or more updated content objects from a content provider application, storing the updated content objects in the database system, and pushing the update to the content objects to the wearable client device via the open communications channel.

In one embodiment, the curated content includes e-learning content relating to retail products or services. In another embodiment, the curated content comprises a key performance indicator for the user of the wearable client device.

In another embodiment, a system for provisioning content for wearable technology devices is disclosed. The system comprises a processor, a database system in communication with the processor via a communications medium, an electronic communications module operable to maintain an open communications channel with a remote wearable client device; and a service module operable for communications with the wearable client device over a second communications channel separate from the open communications channel. The system further includes a system memory configured to store computer code, which when executed by the processor, causes the processor to perform operations for provisioning content for wearable technology devices.

The operations may comprise receiving a notification indicating the wearable client device is within a threshold proximity of a first physical site of multiple physical sites via the open communications channel with the wearable client device, matching the notification received from the wearable client device with an item of content including an identification of the item of content, communicating a first query to the database system for first content objects relating to the item of content, and receiving a first query response from the database system including the first content objects.

The operations may further comprise correlating the first content objects with user profile information of a user of the wearable client device, selecting one or more of the first content objects based on a role of the user of the wearable client device to obtain first curated content, and pushing the first curated content to the wearable client device via the open communications channel with the wearable client device. A proximity sensor device can be associated with the first physical site and can include a sensor identification tag.

In yet other embodiments, a non-transitory computer readable storage medium tangibly embodying computer code for provisioning content for wearable technology devices is disclosed. The computer readable medium is configured to perform operations comprising receiving, at a server computer, a notification indicating the wearable client device is within a threshold proximity of a first physical site of multiple physical sites via an open communications channel between the server computer and the wearable client device, matching the notification received from the wearable client device with an item of content including an identification of the item of content, communicating a first query to the database system for first content objects relating to the item of content, and receiving a first query response from the database system including the first content objects.

The operations may further comprise correlating the first content objects with user profile information of a user of the wearable client device, selecting one or more of the first content objects based on a role of the user of the wearable client device to obtain first curated content, and pushing the first curated content to the wearable client device using an electronic communications module operable to maintain the open communications channel between the server computer and the wearable client device. A proximity sensor device can be associated with the first physical site and can include a sensor identification tag.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

DETAILED DESCRIPTION

Figure 1:
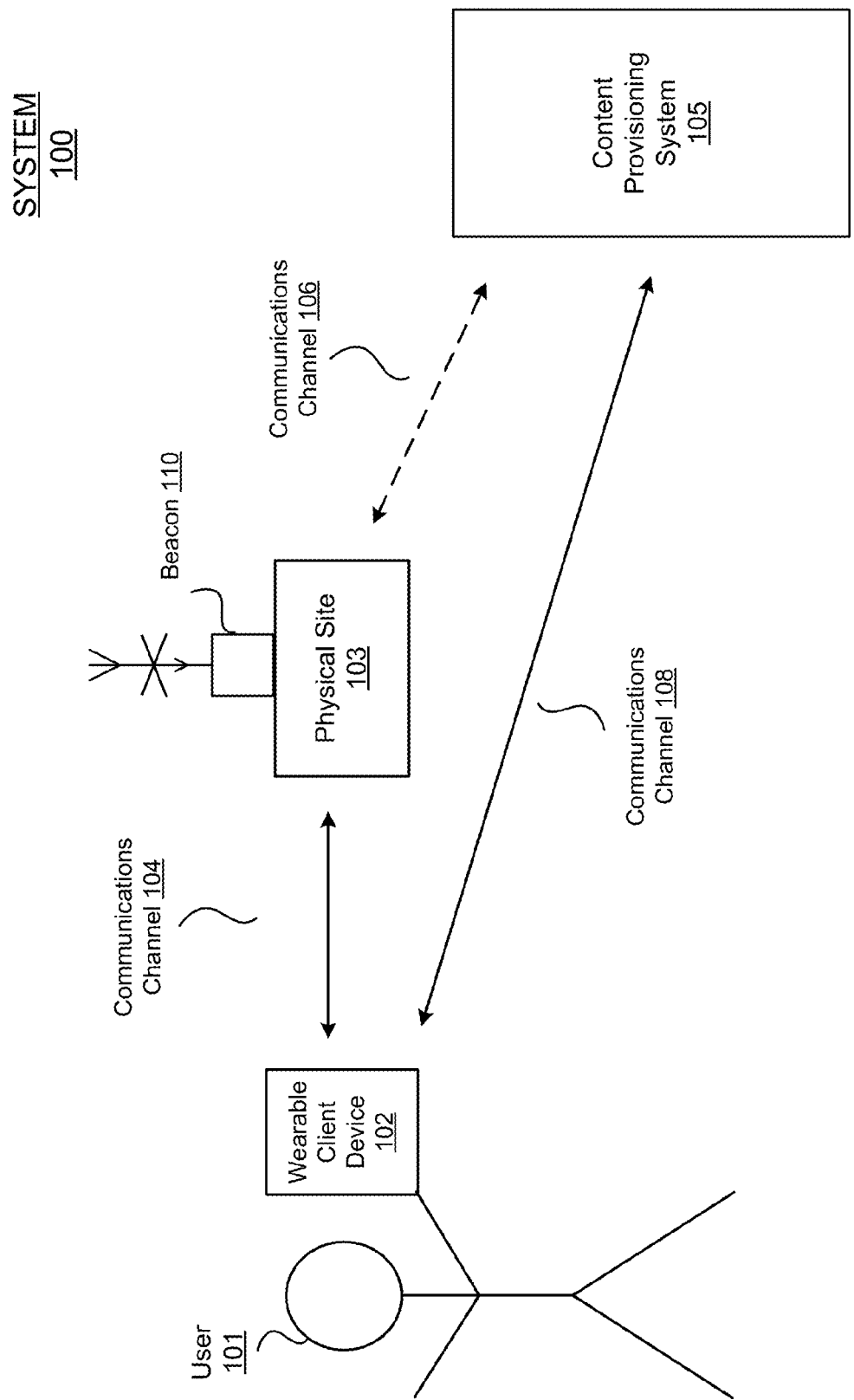
FIG. 1 depicts an example block diagram of an embodiment of a system for provisioning content for wearable technology devices.

Throughout the description, for the purposes of explanation, numerous specific details are set forth in order to provide a thorough understanding of the present disclosure. It will be apparent to one skilled in the art, however, that the techniques described herein may be practiced without some of these specific details. In other instances, well-known structures and devices may be shown in block diagram form to avoid obscuring the underlying principles of the techniques described herein.

The novel embodiments and techniques described herein relate to an improved system and method for provisioning content for users of wearable technology devices. This solution combines the advantages of wearable devices, being mobile and present for customers, with the need to stay well informed about products or services. The embodiments can be configured to push updated information, promotions, or alerts to users. The information can include information about a product or service, or performance targets, or performance metrics. Such information can be provisioned to users on-demand or based on the occurrence of one or more triggering events, and can be accomplished without distracting the user from one or more other tasks or daily routines. The content provided to the wearable technology users can also be curated based on user profile information.

The embodiments described herein relate to an improved system and method for provisioning content for users of wearable technology devices. In order to provide concrete examples to facilitate describing the novel techniques of this disclosure, the retail industry environment has been chosen. The physical retail industry is challenged by the emergence of new technologies and the rapidly growing e-commerce sector. In order to stay relevant, physical stores need to reinvent themselves and shift their focus toward enjoyable in-store experiences and customer-centric services. This shift particularly needs to involve the sales clerk employees, who remain the primary personal contact points for customers in retail stores.

The embodiments described herein, however, are not limited to any particular environment. These novel techniques are operable to provide general information and context information to wearable technology device users, and are applicable to any environment where information can be provided to wearable devices (either pushed to the device or requested (pulled) from the device) during the users' performance of a particular task that requires interaction with people.

The embodiments described herein can be configured to push updated information, promotions, or alerts to users. The information can include information about a product or service, or performance targets, performance indicators, for wearable device users. Such information can be used for the purpose of educating users, such as employees for example. Such information can be provisioned to users on-demand or based on the occurrence of one or more triggering events; and can be accomplished without distracting the user from one or more other tasks or daily routines. Thus the focus is shifted to training and teaching individuals while they complete their work or perform a particular task.

One example solution described herein combines the advantages of wearable devices, being mobile and present for customers, with users' need to stay well informed about products or services. In the retail context, a shop assistant or sales clerk has idle time when there are no customers around. They also need to stay up-to-date with the latest product-related information. Ideally, the idle time can be used to stay up-to-date, while simultaneously being present in the retail store and available to customers.

The shop assistant can be equipped with a wearable device such as a smart glass, a smart watch, electronic contact lenses, headphones, or the like. Once idle, an e-learning mode can be activated on the wearable device. Whenever the individual user walks through the retail store, he or she can receive updated product or service information on the wearable device with video, audio, text, images, or combination of these. The individual can also receive performance metrics or other updated information in real time. The activation of learning content can be presented to the user via multiple well-known and established methods such as Bluetooth iBeacons, NFC tags, geo-location devices, Wi-Fi signals, infrared cameras, or similar mechanisms.

The content can be provided in terms of "learning items," which can include one or more content objects stored in, for example, a database system. These content objects can be retrieved from storage and provided to a wearable application running on a wearable technology device of a user. Users can then consume the content via an interface of the wearable technology device. In the retail space, learning items can include new products or services related to a certain brand, different colors of products, different materials, different methods of fabrication, selling price, etc. For example, a new season can bring new products related to existing brands that have been fabricated from special cotton. The content can also include information relating to the particular retail establishment. Users can be informed that their particular retail establishment is the first one to sell particular products or provide a particular service. Further, the learning item content may include company history, that certain cotton is coming from a certain source, or that a certain product has been colored in Italy, etc.

In addition, the content provided to the users of the wearable devices can be curated based on user profile information. In one embodiment, "content binding" can be performed where content can be associated with the role of the user based on job-type or experience level, etc. For example, senior sales clerks likely do not need to know certain information, such as the background of the company, whereas a junior sales associate might need to know such information. Also authorization for accessing certain content can be based on user profiles.

FIG. 1 depicts an example block diagram of one embodiment of a system for provisioning content for wearable technology devices. In the illustrated embodiment, system 100 includes a wearable client device 102 worn by user 101 that is in communication with a content provisioning system 105 via communications channel 108. The wearable client device 102 is also in communication with a beacon 110 via communications channel 104. The beacon 110 may also optionally be in direct or indirect communication with the content provisioning system 105 via communications channel 106.

The beacon 110 may be any device that includes one or more proximity sensors that can be used to determine the physical location of the beacon 110. For example, the beacon 110 may be implemented as an iBeacon, Bluetooth device, NFC tag, Wi-Fi signal, infrared imaging device, camera, etc. The beacon 110 may include an identification tag that identifies the particular beacon 110 from among multiple beacons. The beacon 110 can be affixed or positioned (or otherwise associated with) a physical site 103. This can be done so that the location of the physical site 103 can be determined based on determining the location of the corresponding beacon 110. In the retail example, beacon 110 can be located near a certain product or group of products, and can be used to determine when the wearable client device 102 is in proximity to the products or group of products at the physical site 103.

The communications channel 104 used for communicating the proximity information between the wearable client device 102 and the beacon 110 may be any type of communications channel configured to facilitate communications between the wearable client device 102 and the beacon 110. For example, if the beacon 110 is implemented as a Bluetooth device, the communications channel 104 can be configured to implement the Bluetooth communications protocol, etc.

In a first alternative embodiment, a wearable client application (not shown) running on the wearable client device 102 is operable to detect when the wearable client device 102 is within the threshold proximity (e.g., within a few feet) of the proximity sensor device(s) of the beacon 110, and therefore within the threshold proximity of the particular product or service located at the physical site 103. In such a case, when the user 101 with an active wearable client device 102 proceeds near the physical site 103 (containing particular products or product groups), the wearable client application can communicate a notification to the content provisioning system 105 indicating its proximity to the beacon 110 via the communications channel 108. This notification may include a token sent to the content provisioning system 105 from the wearable client application indicating that the wearable client device 102 is within the threshold proximity of a particular beacon 110.

The content provisioning system 105 can then recognize the token sent from the wearable client device 102 as indicating proximity to the particular beacon 110 identified by the token. Alternatively, the wearable client application may be configured to correlate the proximity information received from the beacon 110 with certain products or services located at physical site 103, and then send the product or service information to the content provisioning system 105.

In a second alternative embodiment, the beacon 110 can be equipped with one or more sensors configured to detect when the wearable client device 102 is within the threshold proximity of the beacon 110, and therefore within the threshold proximity of the particular product or service associated with the physical site 103. In such a case, when the user 101 with an active wearable client device 102 proceeds near the physical site 103, the one or more sensors of the beacon 110 can be configured to detect that the wearable client device 102 is within the threshold proximity, and to communicate a notification to the content provisioning system 105 indicating its proximity to the wearable client device via the communications channel 106. The notification may include communicating the identification tag of the beacon 110 to the content provisioning system 105.

The content provisioning system 105 can receive the notification from the wearable client device 102 via the communications channel 108 or the beacon device 110 via the communications channel 106, and can query a database system (not shown) to obtain information relating to the location of the beacon 110 associated with the physical site 103. In the retail context, the content provisioning system 105 may query its database system for a known store layout that is equipped with the multiple different beacons 110 to identify the location of the particular beacon 110 based on the identification tag of the beacon and its location in the known store layout.

The content provisioning system 105 can query the physical store layout, including information about locations of products and services in the store, and provide contextual information to the wearable client device 102. For example, the content provisioning system 105 can determine that the user is at a location where there must now be shirts, new shoes, etc. The queried information can include information about the shirts and new shoes, how the shirts should be folded, how to display items of certain color, for example, lighter colors in front and darker colors in back, etc. Once the content provisioning system 105 receives the notification indicating the wearable client device 102 is within the threshold proximity with the beacon 110, the notification can be matched with one or more items of content, the items of content can be queried from the database, and the data obtained can be provided to the wearable client device 102.

In a third alternative embodiment, the beacon device 110 may be equipped with its own memory. In this case, the relevant content can be periodically or asynchronously pushed from the content provisioning system 105 to the particular beacon devices 110 for storage in beacon device memory. This content can then be communicated directly to the wearable client device 202 when it comes within the threshold proximity of the particular beacon device via the communications channel 104.

It should be noted that the wearable client device 102 and the particular beacon 110 may communicate the proximity information to the content provisioning system 105 via a direct or indirect connection. For example, the client application on the wearable client device 102 can be configured to communicate the proximity information to the content provisioning system 105 via one or more intermediary devices or systems, such as via a mobile phone (e.g., through Bluetooth pairing) to leverage the mobile phone's data connection.

Figure 2:
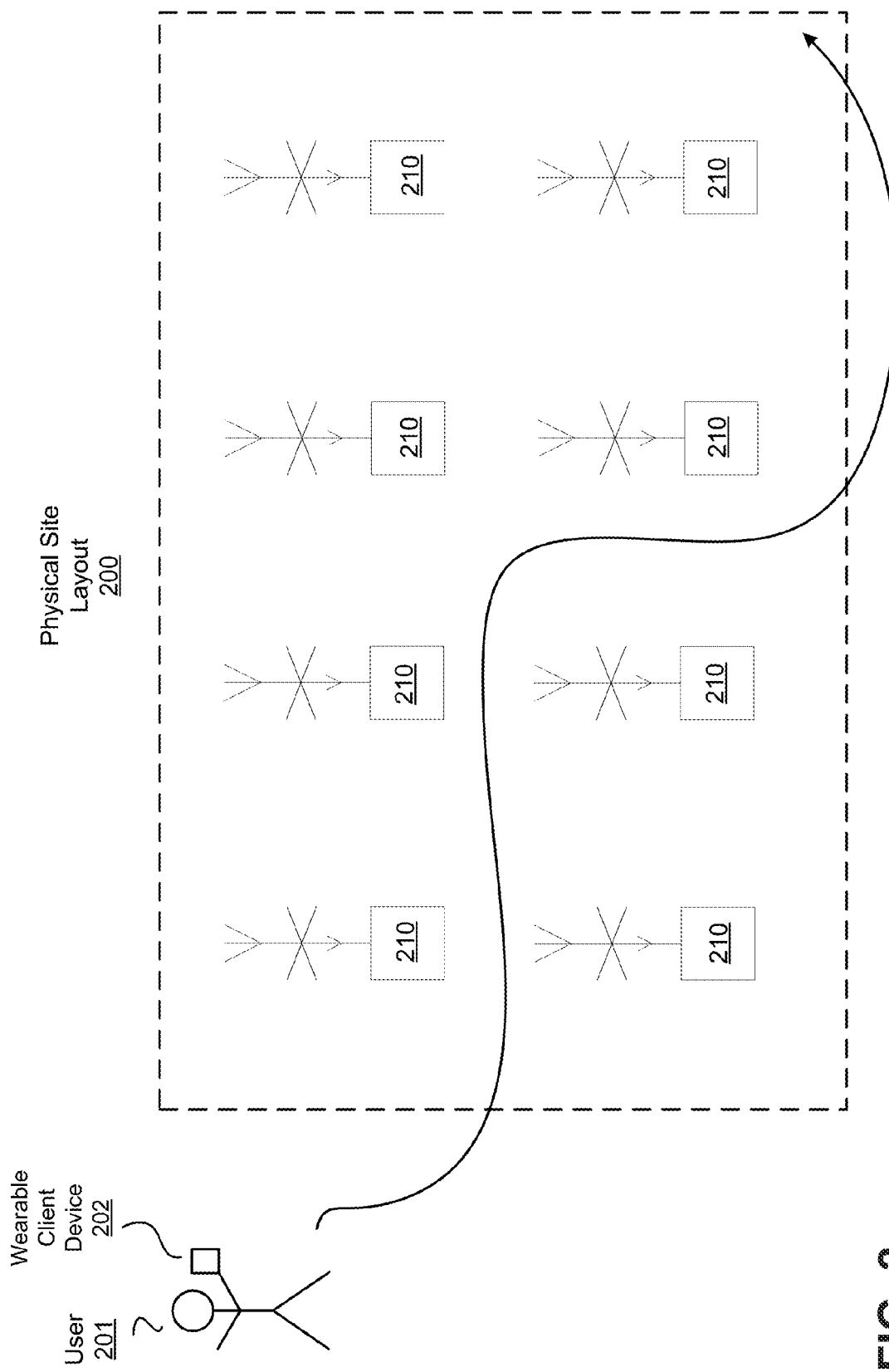
FIG. 2 depicts an example block diagram of a physical site layout used for provisioning content for a wearable technology device.

FIG. 2 depicts an example block diagram of a physical site layout used for provisioning content for a wearable technology device. In the illustrated embodiment, a user 201 wearing an activated wearable client device 202 may proceed past one or more beacons 210 located at different physical locations within a physical site layout 200. As discussed, a beacon 210 or a wearable client application on the wearable client device 202 can be configured to determine when the wearable device 202 is within a threshold proximity of the beacon 210.

A content provisioning system (see FIG. 1) can receive a notification indicating the proximity information, match the notification with one or more items of content, and push the items of content to the wearable client device 202 based on the proximity information. For example, in the retail context, when a user 201 wearing a wearable device 202 proceeds past a particular location in the physical site layout 200, the content provisioning system can be notified. The content provisioning system can then determine product or service related information relevant to the particular location in the physical site layout 200 and communicate content relevant to the product or service to the wearable client device 202. As discussed, the proximity information can be communicated to the content provisioning system via the particular beacon 210 or a client application running on the wearable client device 202.

I. Exemplary Systems

Provided below is a description of an example system upon which the embodiments described herein may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described herein. The described functionality may be performed by custom hardware components containing hardwired logic for performing operations, or by any combination of hardware and programmed computer components. The techniques described herein are not limited to any specific combination of hardware circuitry or software. Embodiments can also be practiced in distributed computing environments where tasks are performed by remote data processing devices or systems that are linked through one or more wire-based or wireless networks.

Figure 3:
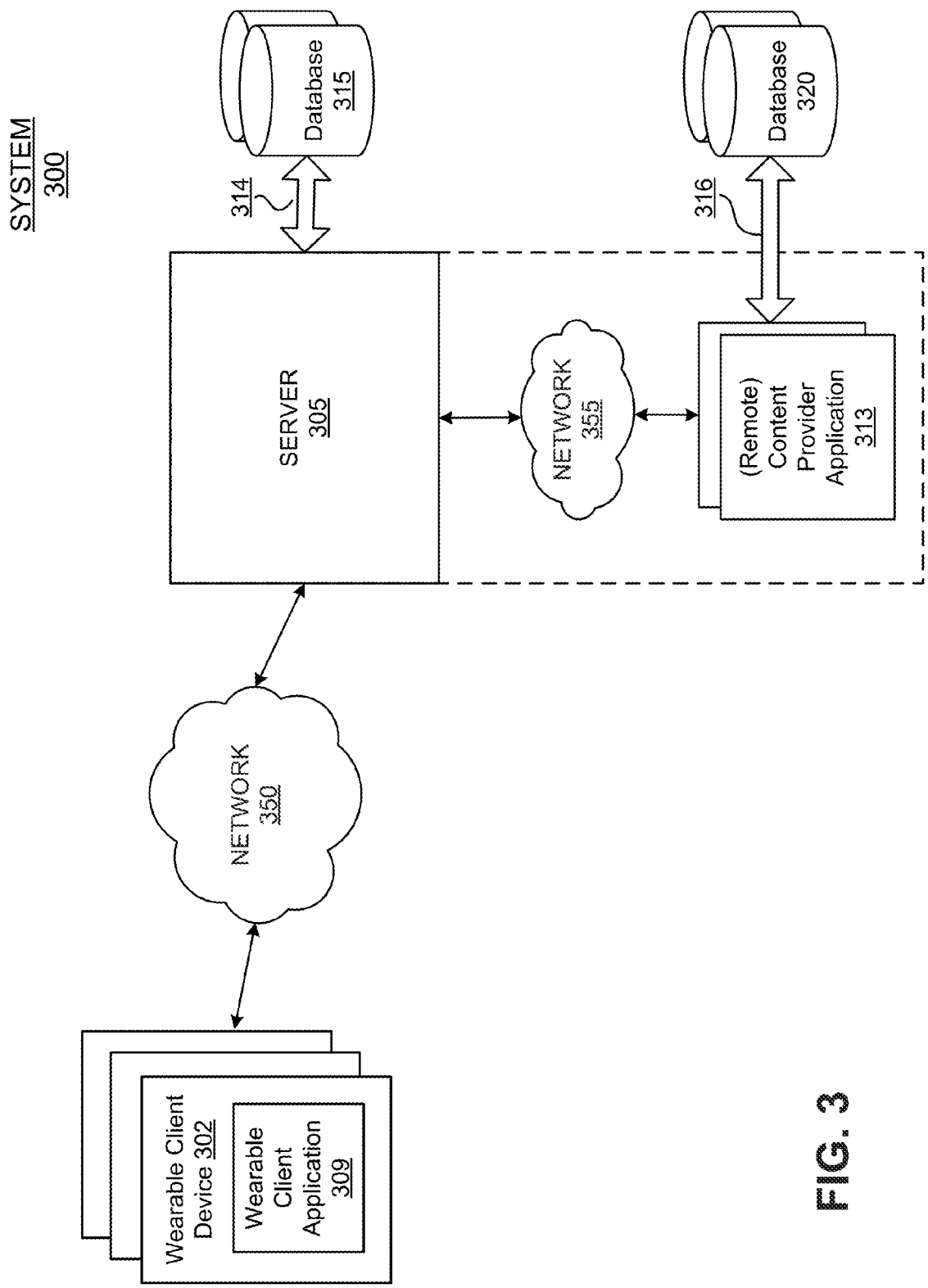
FIG. 3 depicts an example block diagram of an embodiment of a client-server system configuration upon which the embodiments described herein may be implemented.

FIG. 3 depicts an example block diagram of an embodiment of a client-server system configuration upon which the embodiments described herein may be implemented. In the illustrated embodiment, system 300 includes a server computer 305 in communication with one or more wearable client applications 309 corresponding to one or more wearable client devices 302 via one or more networks 350, and in communication with one or more (e.g., remote) content provider applications 313 via one or more networks 355. Server 305 may be implemented as an individual computer hardware server, or as an array of computer servers physically or logically connected together and working in coordination to perform the functionality described herein. Generally, a data server includes a system that performs data operations with respect to data stored in one or more repositories of data. Depending on the type of data server, data operations may range from simple operations, such as storing and retrieving data, to more complex operations such as computing algorithms or calculating statistics based on the data; or arranging, modifying, or formatting the data.

As will be appreciated by persons skilled in the art, networks 350 and 355 can be implemented as any wired or wireless networks. In addition, networks 350 and 355 can be implemented as a single wired or wireless network or multiple separate networks in communication with one another. For example, the networks described herein can be implemented as a local area network ("LAN"), wide-area network ("WAN"), combination of LANs and WANs, the Internet, or any other type of communication network adapted for exchanging electronic messages and information. Further, networks 350 and 355 can be implemented as a physical array of hardware resources or as a virtual array, or any combination thereof. They can also be implemented in a cloud-based network configuration. For example, networks 350 and 355 can be implemented as public or private cloud network, or combination thereof. No specific network or network architecture should be interpreted as limiting the embodiments and techniques described herein.

In the illustrated embodiment, wearable client applications 309 are in communication with the server 305 for the purpose of requesting and receiving relevant content and related information. Wearable client applications 309 may be mobile applications, for example, and may include one or more graphical user interfaces ("UIs") for users to interact with and execute the features of the application. Wearable client applications 309 can communicate with the server 305 via one or more communication networks 350. Wearable client applications 309 can be configured to perform data access operations on data stored in database system 315 by communicating data access requests/commands to the server 305 via network(s) 350. Server 305 can be configured to receive data access requests from the wearable client applications 309, to query database 315 via communications link 314 to retrieve the requested data, and to provide responses including the requested data via network(s) 350.

Server 305 is also in communication with one or more database systems 315 adapted to store content data for use by the wearable client applications 309. Server 305 may be in remote communication with the database 315 via one or more communication links 314. Alternatively, database 315 may be a component of the server 305 and configured to communicate with the server 305 via an interconnect line or other direct or indirect connection or network 314.

Server 305 is also in communication with one or more (e.g., remote) content provider applications 313 via one or more networks 355. As shown, the content provider applications 313 may be in remote communication with the server 305 via network(s) 355, or may alternatively be components within server 305. The content provider applications 313 can be business enterprise applications, such as applications for a purchasing, sales, marketing, or human resources departments, etc. For example, content provider applications 313 can include a customer relationship management ("CRM") system or an enterprise resource planning ("ERP") system configured to store and provide information relating to products, services, financials, or user profile information for users of the wearable client devices 302.

In one embodiment, the content provider applications 313 include a Workforce Performance Builder ("WPB") application provided by SAP SE located in Walldorf, Germany. WPB can be configured to provide a platform for enterprises (or organizations) to create, manage and deploy all kinds of content that helps to train and support employees. The variety of producible content can include, for example, recordings, documentations, context-sensitive user help or e-learning material, etc. This information can be provided to the server 305 and stored in the database 315 via communications link 314. This information can then be provided to the wearable client applications 309 upon launching of the wearable client device 302, upon request from the wearable client applications 309, or upon other triggering events.

At least certain embodiments may function in a "learning mode". The learning mode is an additional embodiment in which the techniques described herein may be used and applied to enable users to benefit from wearable technology. The learning mode can be utilized by employees to essentially catch up on learning or training material while in the their work environment such as a retail store, for example, but not presently engaged with a customer or client. With such an embodiment, learning or training content can be learned on the spot without the need to access a specific training computer that might only be in the back of the store. The employee may remain on the sales area and be present and approachable for customers while, in parallel, catching up on learning content.

The learning mode essentially changes the application on the wearable client device into a mode where specific learning content is offered based on either (i) the location and proximity of the user of the wearable client device 302 (e.g., updates on the new collection of trousers in proximity to the user) or (ii) as a part of the curated content (i.e., a store manager decides that all his sales employees should learn about a new trouser collection and schedules the content to be push to the employee once e-learning mode is activated). This supports an easy and fast way of switching between work activities (e.g., selling activities) and learning activities as required by the particular situation in the store.

Lastly, in the illustrated embodiment databases 315 and 320 may be implemented as any type of database system.

One example embodiment includes a relational database system, in which data is stored in structured tables comprised of rows and columns. Access may be provided through data storage rules or schemas. Other examples of database systems include event-based systems where data can be stored in a semi-structured or unstructured format.

Figure 4:
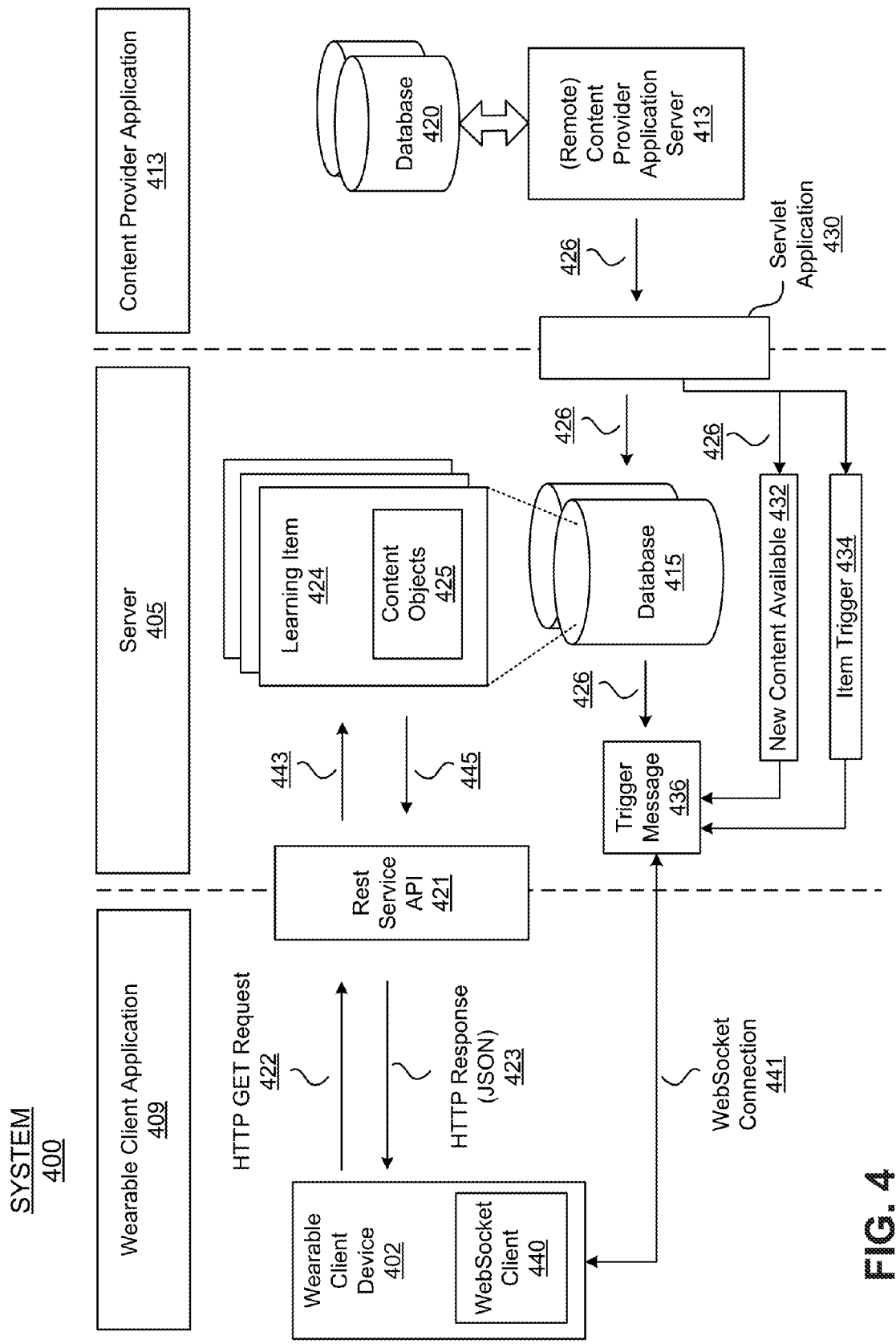
FIG. 4 depicts an example block diagram of an embodiment of a system for provisioning content for a wearable technology device according to the techniques described herein.

FIG. 4 depicts an example block diagram of an embodiment of a system for provisioning content for a wearable technology device according to the techniques described herein. In the illustrated embodiment, system 400 includes a wearable client device 402 in communication with a server computer 405. A wearable client application 409 on the wearable client device 402 can be configured to communicate with server 405 for the purpose of receiving content objects 425 for one or more learning items 424 stored in database 415.

For example, in the retail context the wearable client applications 409 may request and receive access to current sales performance indicators, access to news and training via categories of products or services, and access to product-specific information via scan of a code or product identifier (e.g., bar code or QR code). Scanning a code can offer additional opportunities to retrieve information, for instance, about products such as price, available sizes, etc.; and further details such as related products/accessories, what is usually bought together, material information, and so on. This may notify the user (e.g., sales clerk) to either check for details if no customer is around or to provide specific information during a customer pitch.

The wearable client device 402 may be implemented with scanning functionality to interpret the bar codes, etc., and to provide information about the corresponding products or services. Modern wearable technology devices in general may include libraries that provide scanning capabilities for handling different codes. In addition, separate applications may be loaded onto wearable client devices for this purpose. By providing up-to-date information without interrupting communication with customers, the in-store experience for customers may be increased. In one embodiment, the scan feature may trigger a request for items through a communications channel, such as via a request 422 from the wearable client device 402.

The scanning feature may be based on information that is linked to the scanned code to enable explicit requests for content. In the retail context, the supply chain ends at the retail store. Scanning can be useful, for example, for assessing inventory and in-stock availability. Most merchants have a clear picture of where their products are located, such as in procurement, in stock, on a truck, or at the retail store. Using the scan feature, information such as price, availably, etc. can be obtained. One advantage of the scanning feature is to provide access to such information to increase customary service as well as customer loyalty. The benefits for users may include saving time, no interruption of conversation with customers, hands-free functionality, faster integration of new colleagues, immediate information access for use in customer pitches, and easy entry to conversation.

By leveraging wearable device technology, new opportunities may open up to inform about important changes or updates to product or service information, which can result in quicker decision making and responses to certain situations. To accomplish this, the wearable client application 409 is operable to communicate content requests to the server 405 via a Representational State Transfer ("REST") Service application programming interface ("API") 421 by sending HTTP GET Requests 422 to the server 405. In one embodiment, the content including learning items 424 and other content objects 425 can be transferred in a so-called JavaScript Object Notation ("JSON") format. Other messaging protocols and formats are contemplated within the scope of the embodiments described herein—the embodiments of this disclosure are not intended to be limited to any particular messaging format or protocol.

The wearable client application 409 can be adapted to request a complete list of news items and other related content objects via the REST Services API 421. This task can be triggered, for example, when the wearable client application 409 is first initialized. In addition, learning items 424 can be pushed to the wearable client application 409 manually to trigger new events using a webpage running on the server 405, which can be called to offer several possibilities to generate new events and push them to the wearable client application 409.

The server 405 communicates with one or more databases 415 configured to store the learning items 424 and corresponding content objects 425. The Rest Service API 421 of the server 405 can be configured to "listen" to requests from the wearable client application 409 and to provide HTTP responses 423 (e.g., in JSON format) containing the queried content data. Upon receiving a request 422 from the wearable client 409, the Rest Service API 421 of the server 405 can communicate a query 443 to the database 415 and receive a query response 445 from the database 415 to obtain the requested content objects.

As discussed, content such as news items, promotions, training information, key performance indicators, and other alerts or events can be provided as external content 426 from one or more content provider application servers 413. For example, the external content 426 can be provided by business enterprise applications such as a purchasing department application or a human resources department application, etc. The external content 426 can be stored and accessed from the remote application server's database system 420 and provided to the server 405. In other embodiments, the content provider applications 413 can be located at the server 405.

In the illustrated embodiment, the external content 426 can be communicated in messages to the server 405 via a servlet application 430. A Java "servlet" refers a Java program that extends the capabilities of a server. Servlets are Java classes that receive and respond to web client requests such as HTTP Requests. A webpage on the server 405 can be utilized for generating different events on the server 405. The website can send the requested event type to the server 405. Accordingly, the servlet application 430 can handle the generation of an appropriate event message (such as new content available 432 or item triggers 434). Those events are communicated to the wearable client application 409 over a previously opened WebSocket connection 441 (discussed below).

Notwithstanding, a servlet application is given by way of example and not of limitation as other mechanisms can be used to provide the external data content 426 to the server 405 from one or more content provider applications servers 413. An API can also be used to provide the external data content 426 to the server. For example, an open API may be provided to a search engine to let the search engine access and index the product information in the database 415 of the server. The external content 426 can also be pushed to the wearable client device 402 via an additional communication channel upon occurrence of a triggering event using one or more trigger messages 436. For instance, as discussed above the system 400 can be configured to receive notifications from the wearable client application 409 or from a beacon device. In such a case, the notification can be sent to the server 405 via the additional communication channel, such as, for example, a WebSocket connection.

In the illustrated embodiment, the additional communication channel includes a WebSocket connection 441 using one or more trigger messages 436. A web application (not shown) running on the server 405 can create a secure communications channel with the wearable client application 409 using an electronic communications module referred to as a "WebSocket". A WebSocket connection provides an open, bi-directional communications channel between devices, typically between a client and server. WebSockets offer a simple two-way communication link between devices.

The WebSocket protocol makes possible more interaction between a web browser and a website, facilitating communication of real-time content. WebSockets provide a standardized way for servers to send content to web browser without first being solicited by the client, which allows for messages to be passed back and forth transparently to the client, while keeping the connection open and active. WebSockets can include HTML5 (or equivalent) capability to permit bi-directional communications. Such a connection is persistent between the client browser and the server, and either end can send data to the other at any time.

Updates or other content 426 can be pushed to the wearable client device 402 via the WebSocket connection 441 upon occurrence of an item trigger 434 or when new content becomes available 432. The host server 405 can open a communications endpoint to which other sockets can register to. As soon as the connection is open, sockets can send messages asynchronously to the opposing socket. As such, the wearable client application 409 does not need to regularly request updates, but instead gets its information pushed through the WebSocket connection 441. The content 426 can be pushed asynchronously to the wearable client device 402 via its WebSocket client 440.

It is noted that the WebSocket connection 441 is a separate communication channel from the communication channel managed by the Rest Service API 421, and can be used particularly as a direct channel between the server 405 and the wearable client device 402 to receive triggering events from the wearable client application 409 (or via webpage input on the server) and to push new content 432 directly to the wearable client application 409 based on the triggering events. The web page on the server may remain open to facilitate bi-directional, ongoing communications between a web browser and the server. Using the WebSocket connection 441, the wearable client application 409 running on the wearable client device 402 can be synchronized with the web browser (not shown) on the server 405.

The embodiments described herein, however, are not limited to use of a WebSocket. Any other electronic communications module or protocol configured for two-way communications can be utilized. For instance, in at least certain embodiments other forms of electronic or optical communications, such TCP/IP communications, can also be utilized instead of a WebSocket. A polling system can further be used to make repeated calls to the same open endpoints.

Figure 5:
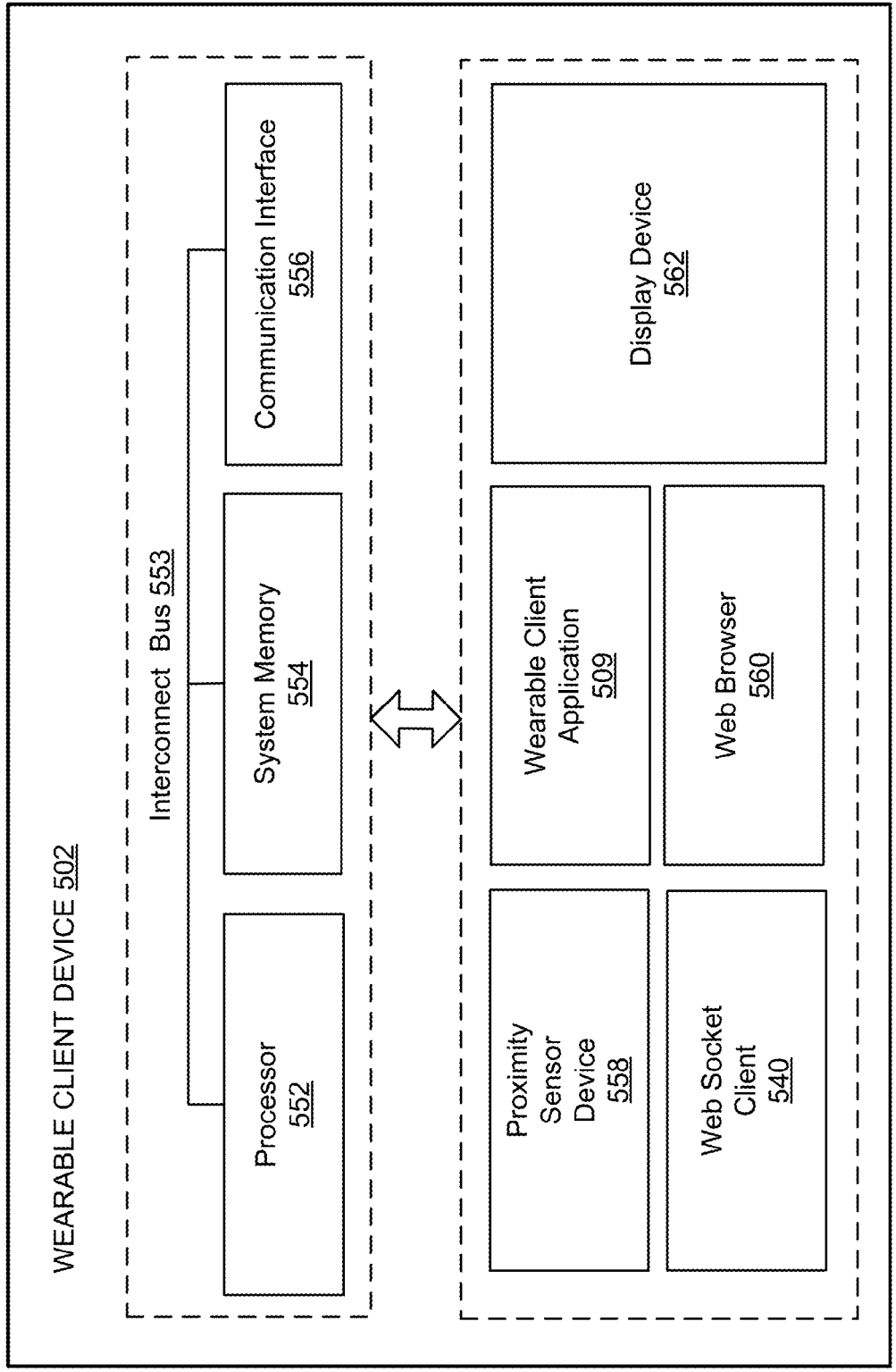
FIG. 5 depicts an example block diagram of an embodiment of a wearable client device.

FIG. 5 depicts an example block diagram of an embodiment of a wearable client device. In the illustrated embodiment, wearable device client 502 includes a processor 552, system memory 554, and communications interface 556 in communication with one another via an interconnect bus 553. The wearable client device 502 further includes the wearable client application 509 discussed above, a web browser 560, and a display device 562.

A proximity sensor device 558 is also provided for detecting when the wearable client device 502 is within a threshold proximity of a beacon associated with a physical site. And a WebSocket client 540 is provided, as discussed above, to facilitate open, direct, and bi-directional communications between the wearable client device 502 and the content provisioning server computer.

Figure 6:
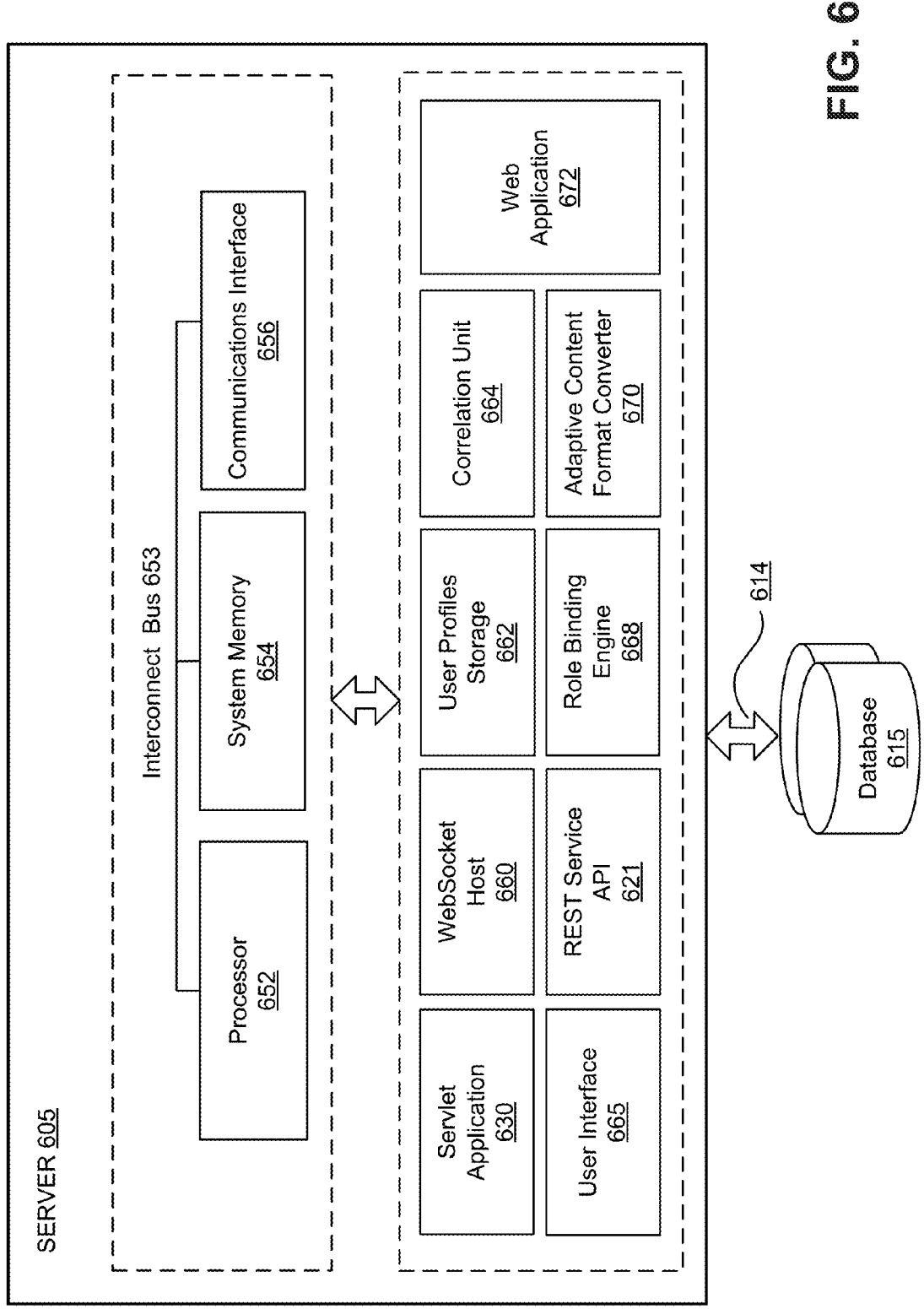
FIG. 6 depicts an example block diagram of an embodiment of a server computer operable for provisioning content for wearable technology devices.

FIG. 6 depicts an example block diagram of an embodiment of a server computer operable for provisioning content for wearable technology devices. In the illustrated embodiment, server 605 is in communication with database 615 via a communications link 614. Server 605 includes a processor 652, a system memory 654, and a communications interface 656 in communication with one another via an interconnect bus 653. The server 605 further includes a user interface 665, a servlet application 630, and a web application 672. As discussed above, a webpage on the server 605 may be used for triggering events on the server 605 via the servlet application 630 (or other similar mechanism) by sending information to the wearable client application from web input received via one or more user interfaces 665 of the server 605.

In the illustrated embodiment, server 605 further includes a WebSocket host 660 operable for communications with the WebSocket endpoint on a wearable client device via the WebSocket connection discussed above. Server 605 also includes a correlation unit 664, user profiles storage 662, and a role binding engine 668. User profiles information can be provided by one or more content provider applications and stored in the user profiles storage 662 of the server 605. In one embodiment, the user profiles storage 662 can be incorporated into database system 615.

In at least certain embodiments, the server 605 is operable to correlate items of content comprising one or more content objects with user profile information of the user of the wearable client device using the correlation unit 664. The correlation can be performed to "curate" the content and tailor it for each individual user and wearable client device. In this manner, curated content can be provided to a user that includes learning items relevant to, for example, the user's job-type or experience level. The role binding engine 668 can be part of the correlation unit 664 or can be its own separate component as shown in FIG. 6. The role binding engine can be used to associate users with their role information that is stored in the user profiles storage 662. This information can be provided to the correlation unit 664 during correlation operations.

Finally, server 605 includes an adaptive content format converter 670 configured for formatting content sent from the server 605 to be of a form factor compatible with the particular wearable client device and display screen size.

Figure 7:
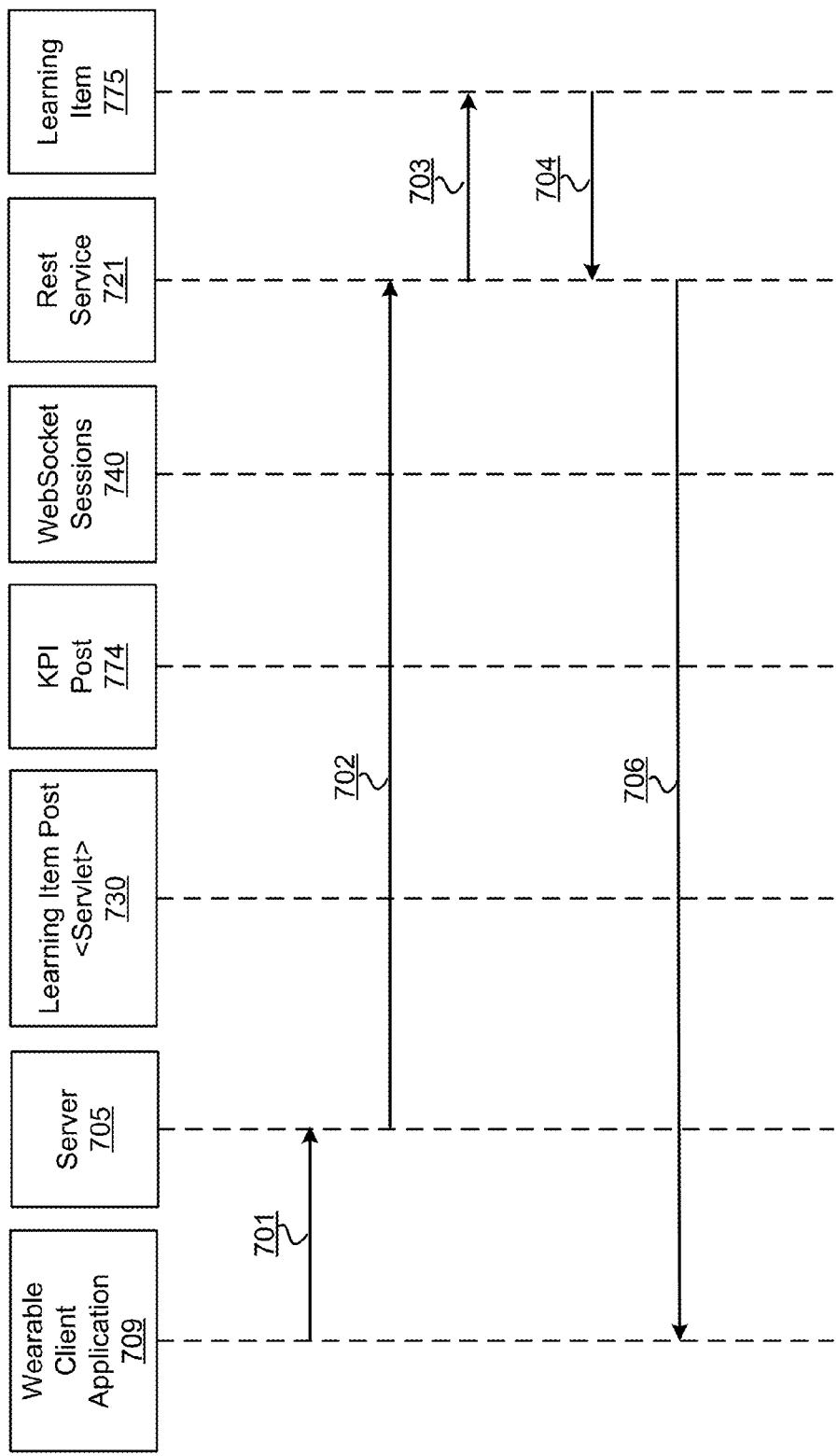
FIG. 7-9 depict example sequence diagrams for provisioning content for a wearable technology device according to the techniques described herein.

FIG. 7 depicts an example sequence diagram for provisioning content for a wearable technology device according to the techniques described herein. This embodiment relates to returning a list of available new items or updates of content. This embodiment can be triggered, for instance, when the wearable client device application is first initialized. The wearable client application 709 can communicate a request 701 for new items or updates to the server 705. In one embodiment, the request comprises an HTTP GET request. This request is then communicated via a message 702 to the REST service 721. The REST service 721 then communicates a query 703 to the database system (not shown) to obtain one or more learning items 775 corresponding to the request 701. A response 704 comprising the learning item(s) 775 can then be communicated to the REST service 721, which communicates a message 706 comprising the response to the request to the wearable client application 709. The message 706 can include a list of available learning items 775 corresponding to the request 701. In one embodiment, the request and response messages are communicated using JSON format.

Figure 8:
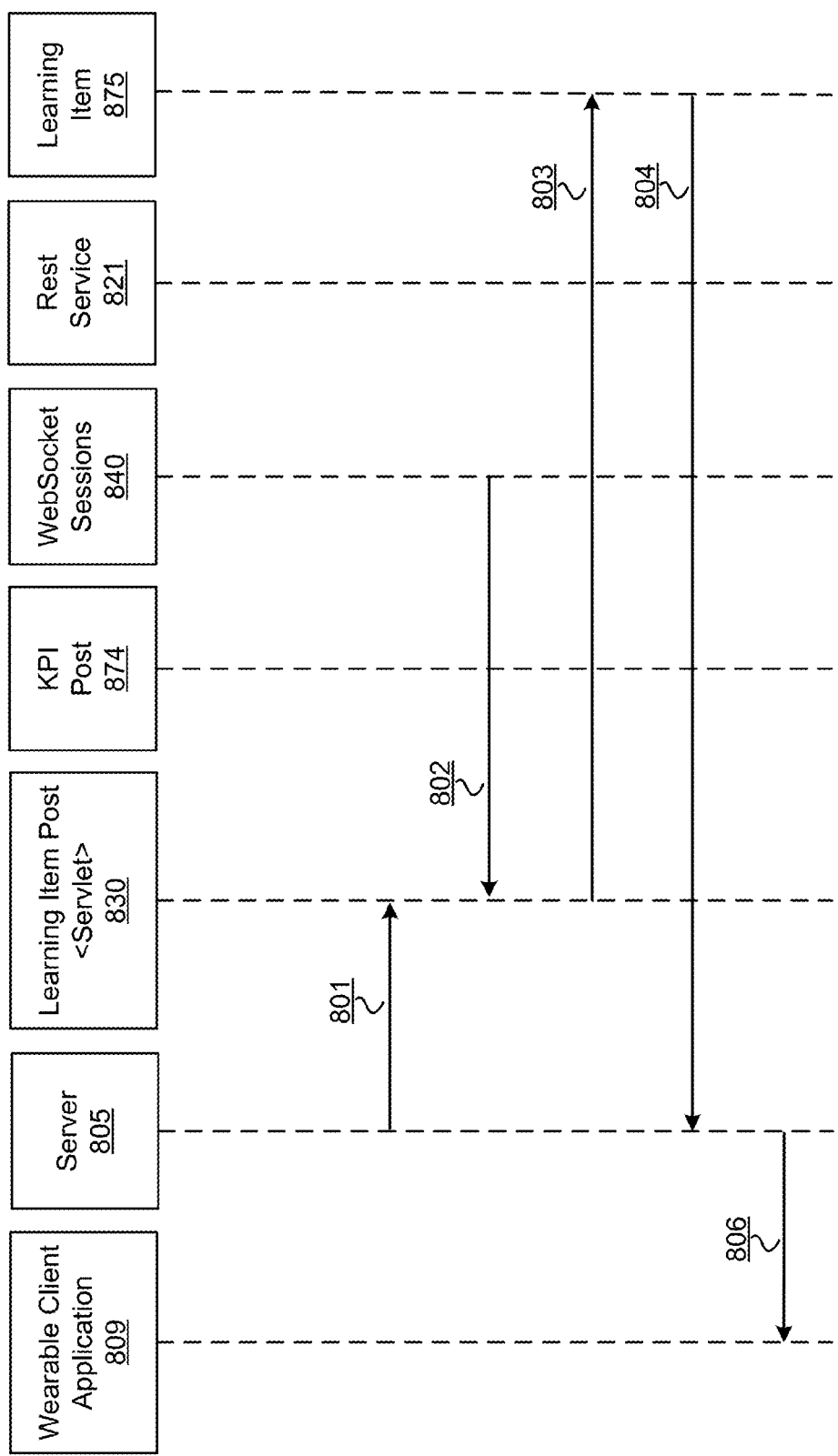

FIG. 8 depicts an example signal flow diagram for provisioning content for a wearable technology device according to the techniques described herein. This embodiment relates to handling of events that invoke incoming messages or status changes on the wearable client application 809. In the illustrated embodiment of FIG. 8, a POST request 801 for new items or updates is communicated by the server 805 to the servlet 830 requesting a learning item post. A POST request can include a request for information or news items that have changed.

This can happen, for example, after an input is received on a webpage via the server 805. As described above, additional content or updates can be pushed to the wearable client application 809 via the open communications channel (e.g., one or more WebSocket connections) using a web page on the server 805. The servlet application can be implemented using other known mechanisms with comparable functionality. Alternatively, the POST request can be triggered from a trigger message 803 via the WebSocket sessions 840. This can occur based on triggering events such as detecting when the wearable client device is within the threshold proximity of a proximity sensor in a particular physical site as described previously.

The servlet 830 then communicates a query 803 to the database for one or more learning items 875. The query response 804 can then be provided to the server 805 and communicated in a message 806 to the wearable client application 809.

Figure 9:
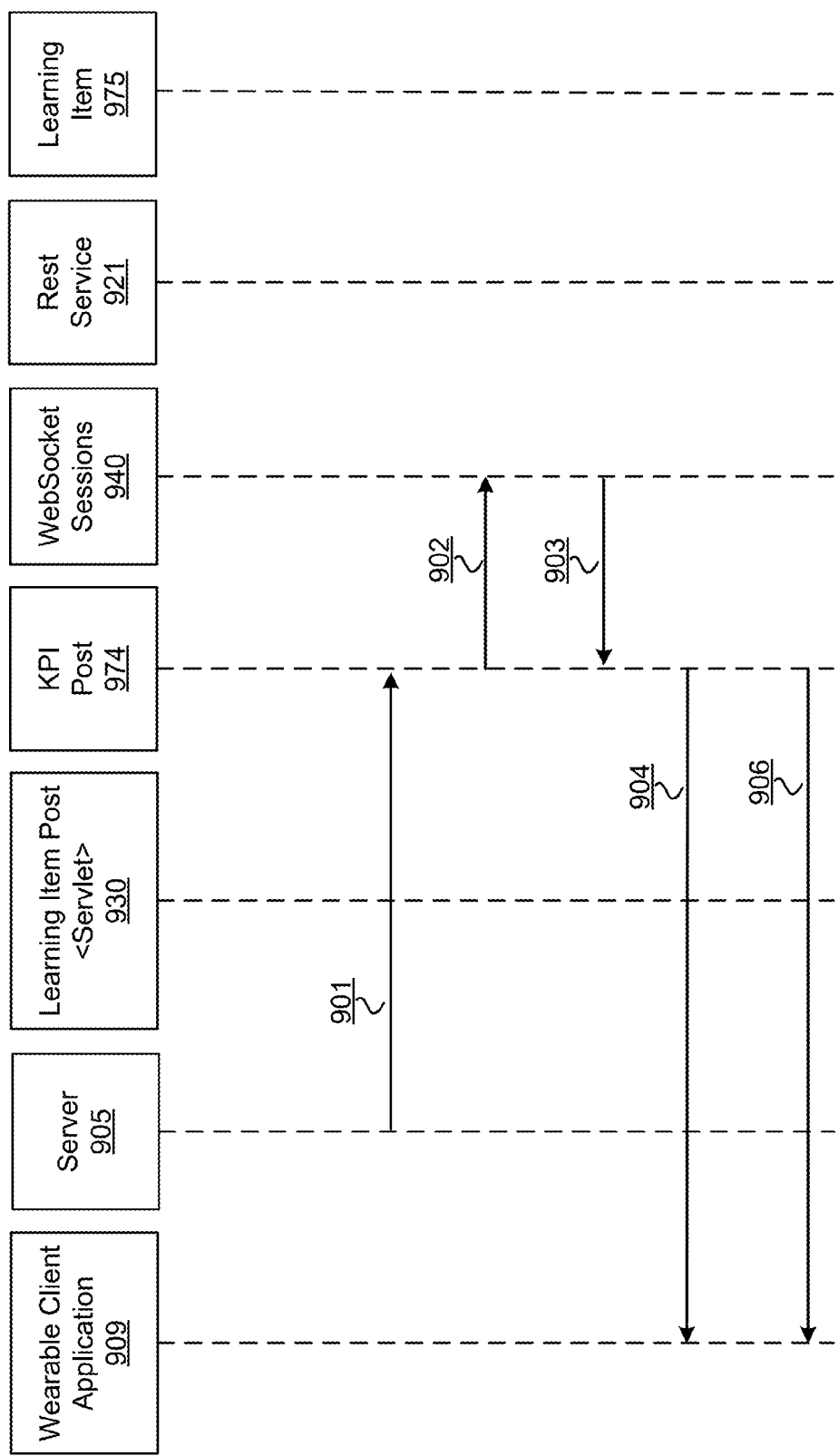

FIG. 9 depicts an example signal flow diagram for provisioning content for a wearable technology device according to the techniques described herein. In this embodiment, the POST request 901 includes information relating to a new or updated key performance indicator ("KPI") corresponding to the user of the wearable client device. The POST request 901 is communicated from the server 905 to the KPI Post servlet 974. The KPI Post servlet 974 then communicates a "get Sessions" request 902 to the WebSocket Sessions 940 to determine which wearable client devices are active and listening for updates.

The WebSocket Sessions 940 communicates a response 903 identifying the wearable client devices that are active and listening for updates to the KPI Post servlet 974, which then communicates a KPI value in a message 904 to each of the wearable client applications 909 identified as active. The KPI Post servlet 974 can further communicate a message 906 comprising a target color indicating whether the KPI value is achieving or missing target KPI values. In one embodiment, the target colors comprise red, yellow and green based on the status of the KPI value.

The KPI values can reflect sales KPIs such as individual or group sales. For example, the sales KPIs can reflect daily sales targets, current sales value, and status changes (e.g., by color). The KPI values can also reflect product KPIs such as product-specific facts like price and availability.

II. Exemplary Processes

Figure 10:
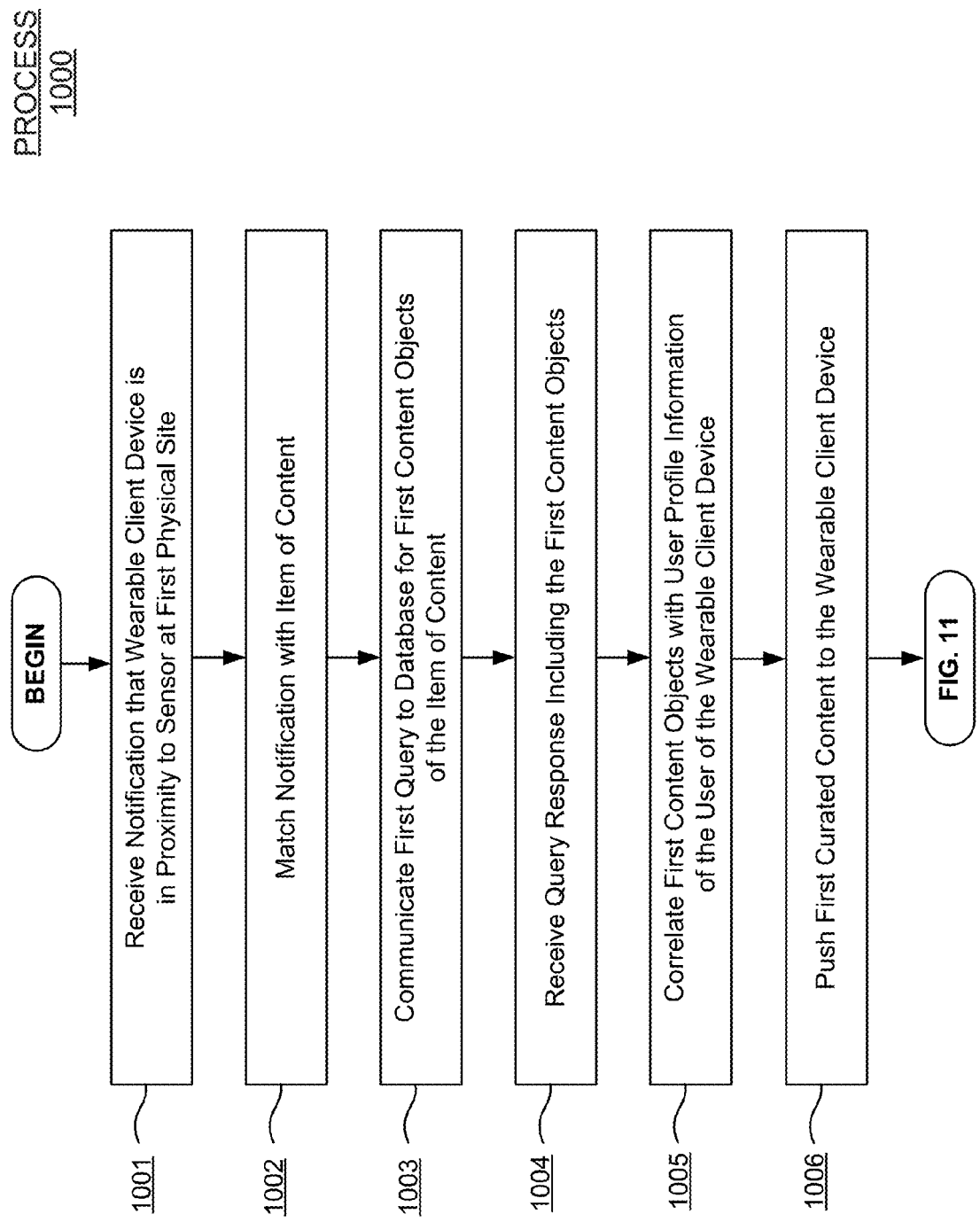
FIGS. 10-11 depict example flow charts illustrating an embodiment of a process for provisioning content for wearable technology devices according to the techniques described herein.
Figure 11:
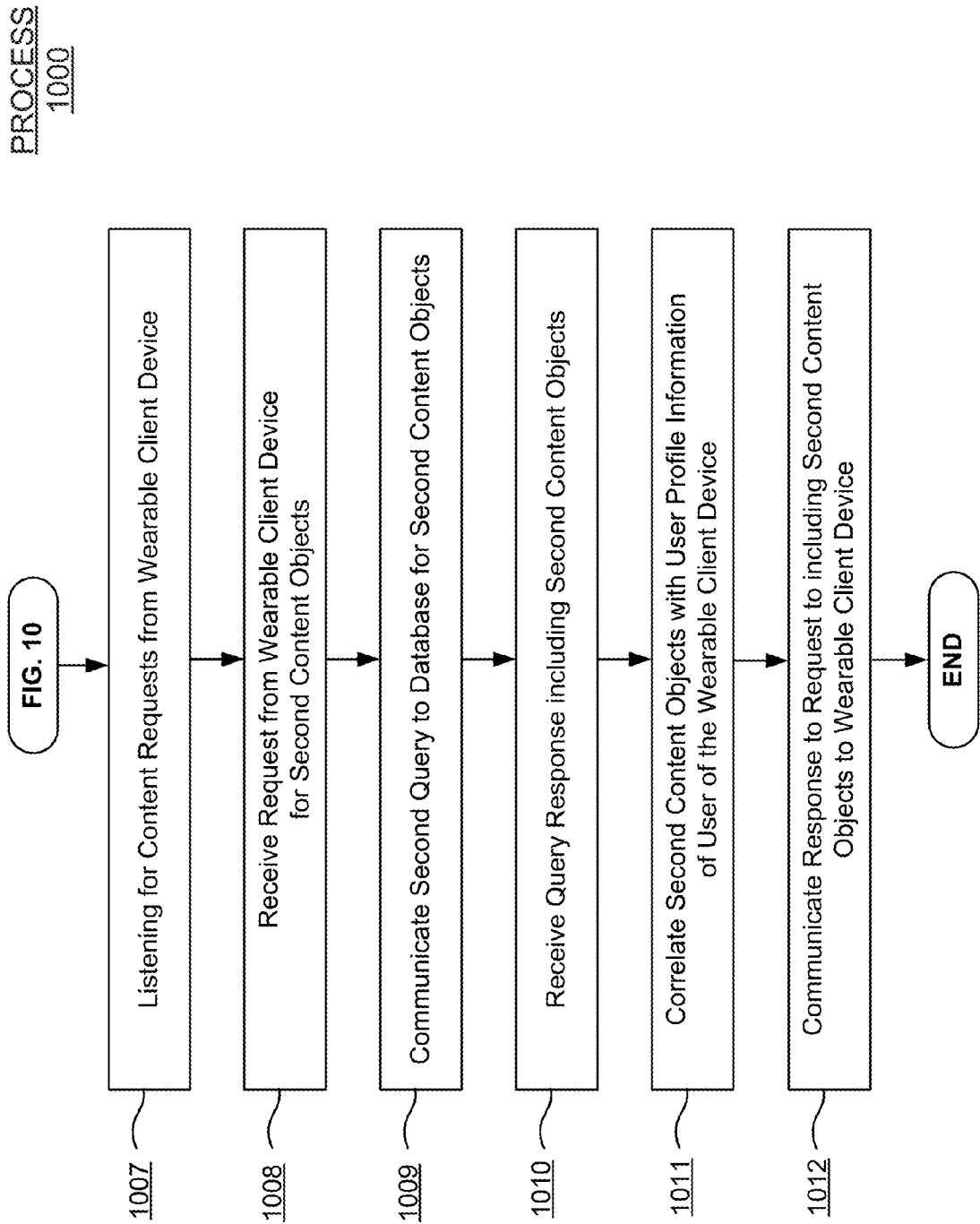

FIGS. 10-11 depict example flow charts illustrating an embodiment of a process for provisioning content for wearable technology devices according to the techniques described herein. It is noted that the processes described below are exemplary in nature and are provided for illustrative purposes and not intended to limit the scope of the disclosure to any particular example embodiment. For instance, methods in accordance with some embodiments described herein may include or omit some or all of the operations described below, or may include steps in a different order than described herein. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

In the illustrated embodiment of FIG. 10, process 1000 begins at operation 1001 by receiving, at a server computer, a notification indicating a wearable client device is within a threshold proximity of a sensor associated with a first physical site of multiple physical sites. In one embodiment, the sensor can include an identification tag. Process 1000 continues at operation 1002 by matching the notification received from the wearable client device with an item of content. The item of content may include an identification for the item of content. The item of content may also include context information for the item of content.

Process 1000 continues by communicating a first query to a database system for first content objects relating to the item of content (operation 1003), receiving a first query response from the database system including the first content objects, (operation 1004), and correlating the first content objects with user profile information of a user of the wearable client device to obtain first curated content (operation 1005). The first curated content can be selected based on the role of the user of the wearable client device. Process 1000 may then be configurable to push the first curated content to the wearable client device (operation 1006). In one embodiment, the first curated content can be pushed to the wearable client device using an electronic communications module operable to maintain an open communications channel between the server computer and the wearable client device. Process 1000 continues on FIG. 11.

Process 1000 continues at operation 1007 in the illustrated embodiment of FIG. 11 by listening for content requests from the wearable client device. Process 1000 is then configured for receiving a request for one or more second content objects from the wearable client device (operation 1008), communicating a second query to the database system to obtain the requested second content objects (operation 1009), receiving a query response from the database system including the second content objects (operation 1010), correlating the second content objects with the user profile information of the user of the wearable client device to obtain second curated content (operation 1011), and communicating a response to the request from the wearable client device including the second curated content via a communications channel separate from the open communications channel (operation 1012).

A wearable client application on the wearable client device may be provided that is operable to detect when it is within the threshold proximity of the proximity sensor device and to send a notification to the content provisioning system when the threshold proximity is reached. In addition, updates to an item of content comprising one or more content objects can be received from a content provider application and stored in the database system to be later pushed to the wearable client device via the open communications channel. This completes process 1000 according to one example embodiment.

Figure 12:
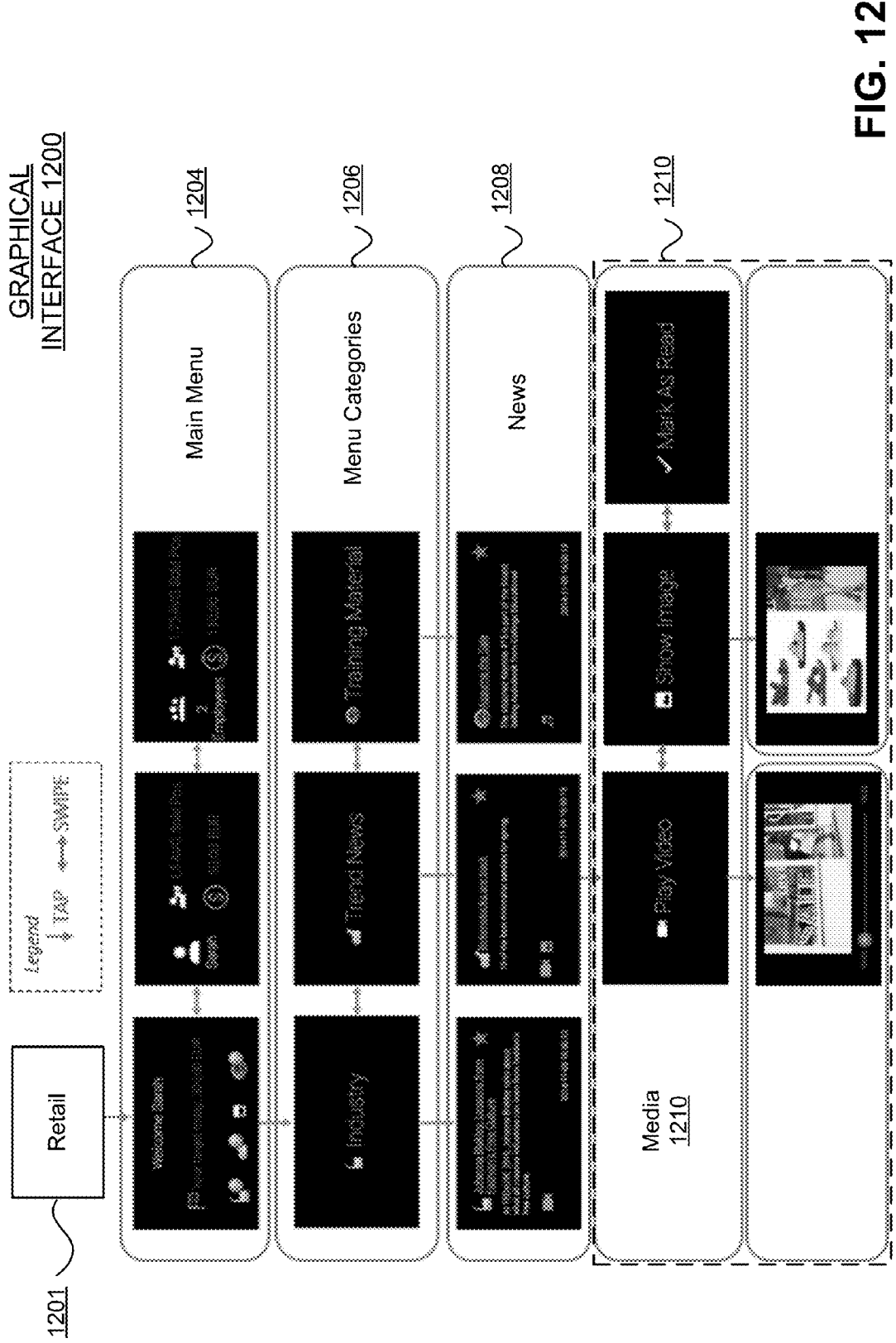
FIG. 12 depicts an example embodiment of a user interface on a wearable technology device showing user interface display cards.

FIG. 12 depicts an example embodiment of a user interface on a wearable technology device showing user interface display cards. In the illustrated embodiment, the graphical interface 1200 can be accessed with a tap on the card entitled "Retail" 1201. This can access a first level of cards relating to the top-level main menu 1204. As shown, a welcome screen can be displayed showing user sales targets, new message indicators, new e-learning item indicators, and KPI indicators. Users can then swipe the cards to access additional content such as employee or group sales averages, etc. Additional cards can be accessed that show the sales KPIs including turnover and average number of articles sold per customer. In the figure, two different cards are shown: one with values for the current user and one with aggregated team values. Colors can also be used to indicate current performance in comparison to the sales goal of the day.

With a tap on the category card, users can access a second level of cards relating to menu categories 1206, which can include industry, trend news, and training material categories. A list of menu categories is displayed from which the user can choose a news category. Users can swipe cards within this level to change categories 1206.

The selection of a category opens a list of associated news (unread items first). In one embodiment, a news card can contain the following information: the category, a title, a description, and a date. An additional tap can access additional card levels including news 1208, as well as various forms of media content 1210, including video, text, and image content. For each of the news items, further actions can be accessed depending on the available content types and the read-status, for example: "Play Video", "Show Image", or "Mark as Read".

The defined scenarios suggest that the employee wears the device throughout the workday to have immediate access to necessary information. The in-store tasks are manifold and require employees' major attention; therefore, users should have the freedom to decide when to check for any details. By leveraging wearable device technology, new opportunities open up to inform about important changes or updates immediately, which may result in faster decision processes or responses in certain situations. Notifications are configured when new information is available and to inform users when the KPIs reach a critical status.

III. Exemplary Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 13:
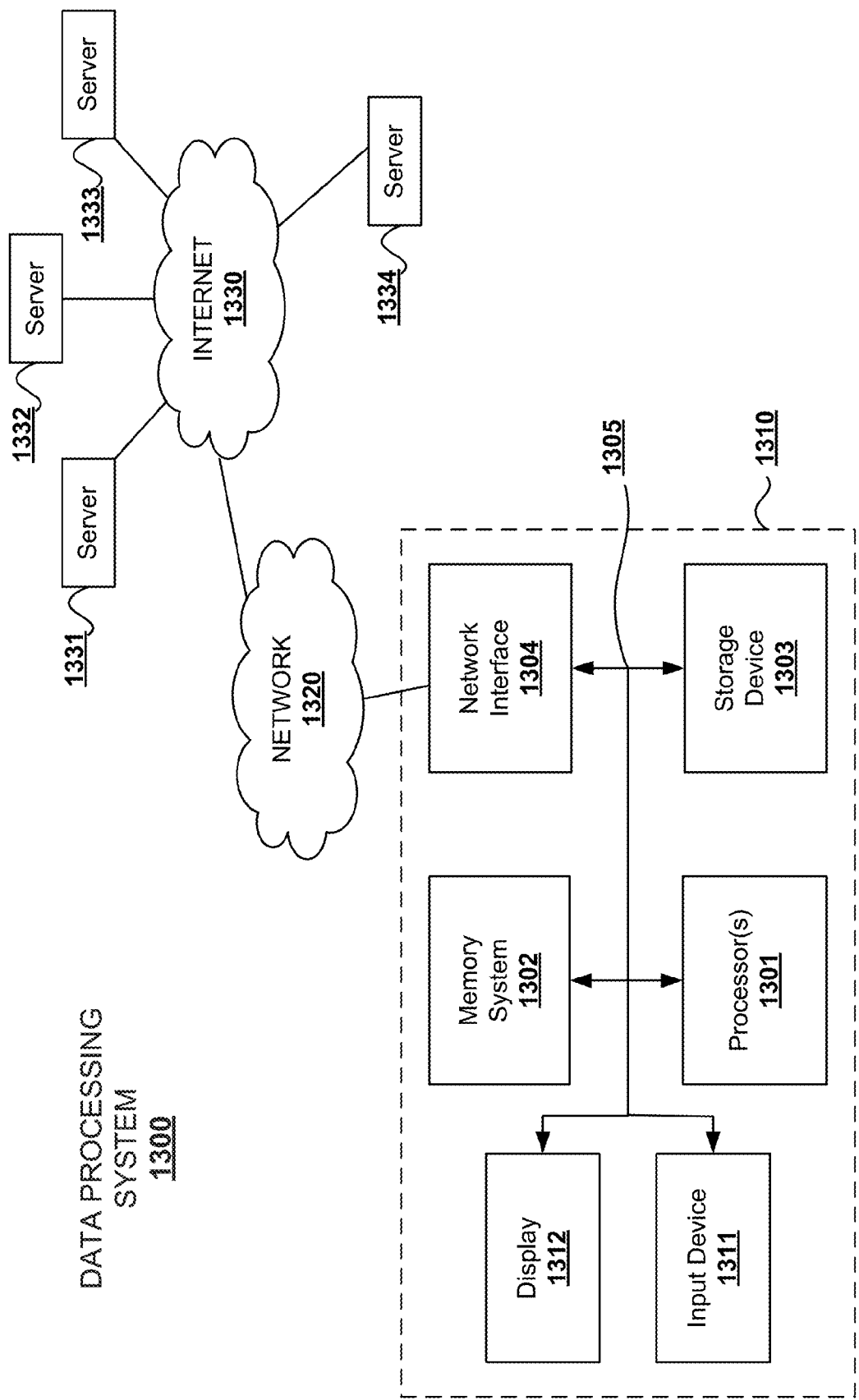
FIG. 13 depicts an example overview block diagram of a data processing system upon which the embodiments described herein may be implemented.

FIG. 13 depicts an example overview block diagram of a data processing system upon which the embodiments described herein may be implemented. The following hardware description is merely one example. It is to be understood that a variety of computers configurations may be used to implement the described techniques. While FIG. 13 illustrates various components of a data processing system 1300, it is not intended to represent any particular architecture or manner of interconnecting components. It will also be appreciated that network computers and other data processing systems, which have fewer components or additional components, may be used. The data processing system 1300 may, for example, comprise a personal computer (PC), workstation, laptop computer, tablet, smartphone or other hand-held wireless device, or any device having similar functionality.

In the illustrated embodiment, data processing system 1300 includes a computer system 1310. Computer system 1310 includes an interconnect bus 1305 (or other communication mechanism for communicating information) and one or more processor(s) 1301 coupled with the interconnect bus 1305 for processing information. Computer system 1310 also includes a memory system 1302 coupled with the one or more processors 1301 via the interconnect bus 1305. Memory system 1302 is configured to store information and instructions to be executed by processor 1301, including information and instructions for performing the techniques described above. This memory system may also be used for storing programs executed by processor(s) 1301. Possible implementations of this memory system may be, but are not limited to, random access memory (RAM), read only memory (ROM), or combination thereof.

In the illustrated embodiment, a storage device 1303 is also provided for storing information and instructions. Typically storage device 1303 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 1303 may store source code, binary code, or software files for performing the techniques above. In addition, while FIG. 13 shows that storage device 1303 as a local device connected with the components of the data processing system, it will be appreciated by skilled artisans that the described techniques may use a storage device remote from the system, such as a database or other network storage device coupled with the computer system 1310 through a network interface such as network interface 1304.

Network interface 1304 may provide communications between computer system 1310 and a network 1320. The network interface 1304 may be a wireless or wired connection, or any combination thereof. Computer system 1310 is configured to send and receive information through the network interface 1304 across one or more networks 1320 such as a local area network (LAN), wide-area network (WAN), wireless or Bluetooth network, or the Internet 1330, etc. Computer system 1310 may access data and features on systems residing on one or multiple different hardware servers 1331-1334 across the network 1320. Hardware servers 1331-1334 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 1310 may be coupled via interconnect bus 1305 to a display 1312 for displaying information to a computer user. An input device 1311 such as a keyboard, touchscreen, and/or mouse is coupled to bus 1305 for communicating information and command selections from the user to processor 1301. The combination of these components allows the user to communicate with the system. In some systems, bus 1305 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

What is claimed is:

1. A method comprising:
   detecting a location of a wearable client device within a threshold proximity of a proximity sensor device of a first physical site of multiple physical sites, the proximity sensor device having a sensor identification tag to identify location of the proximity sensor device;
   after the detecting step, a content provisioning system receiving, via an open communications channel between the content provisioning system and the wearable client device, a notification, either from the wearable client device, in the form of a token, or from the proximity sensor device, in the form of the identification tag, and based on the notification, identifying the location of the wearable client device relative to the location of the first physical site, the content provisioning system including a database system and a server computer;
   matching the received notification with an item of content including an identification of the item of content;
   querying the database system based on the identification of the item of content;
   in response to the querying, the content provisioning system receiving a first query response from the database system including first content objects;
   correlating the first content objects with a role of a user of the wearable client device corresponding to the user's authorization access to data included in the first content objects, the role and authorization access being a part of a user profile information associated with the user, and in accordance therewith, curating the first content objects to obtain a first curated content by associating the first content objects with the role and authorization access of the user; and pushing, using an electronic communications module operable to maintain the open communications channel between the server computer and the wearable client device, the first curated content to the wearable client device relevant to the first physical site and identified based on the role and authorization access of the user thereby providing relevant content to the wearable client device with authorized access to the relevant content by the user.

2. The method of claim 1 further comprising:

listening, by the server computer, for content requests from the wearable client device over a second communications channel separate from the open communications channel between the server computer and the wearable client device;

receiving a request from the wearable client device for one or more second content objects via the second communications channel;

the content provisioning system communicating a second query to the database system to obtain the requested second content objects;

receiving a second query response from the database system including the second content objects;

correlating the second content objects with the user profile information of the user of the wearable client device to obtain second curated content; and the content provisioning system communicating a response to the request from the wearable client device including the second curated content via the second communications channel.

3. The method of claim 1 further comprising:

receiving an update to the item of content comprising one or more updated content objects from a content provider application;

storing the updated content objects in the database system, and pushing the updated content objects to the wearable client device via the open communications channel.

4. The method of claim 1 wherein a wearable client application on the wearable client device performing the detecting when the wearable client device is within the threshold proximity of the proximity sensor device, and communicating the notification to the server computer.

5. The method of claim 4 wherein the notification indicating the wearable client device is within the threshold proximity of the first physical site comprises sending the token the server computer from the wearable client application on the wearable client device.

6. The method of claim 1 wherein the detecting the wearable client device is within the threshold proximity of the proximity sensor device comprises communicating the notification to the server computer.

7. The method of claim 6 wherein the notification, from the proximity sensor device, indicating the wearable client device is within the threshold proximity of the first physical site comprises the proximity sensor device sending the sensor identification tag to the server computer.

8. The method of claim 1 further including, in response to the wearable client device being in threshold proximity to a second physical site, curating one or more content objects with a second role of and a second authorization access by the user and pushing to the wearable client device the one or more content objects relevant to the second physical site and identified based on the second role of and second authorization access by the user.

9. The method of claim 8 wherein the items of content comprise products or services, one or more learning items, or a combination thereof, and the first curated content comprises a key performance indicator for the user.

10. A system comprising:

a processor;

a database system in communication with the processor via a communications channel;

an electronic communications module operable to maintain an open communications channel with a wearable client device; and a service module operable for communications with the wearable client device over a second communications channel separate from the open communications channel; and a system memory configured to store computer code, which when executed by the processor, causes the processor to perform operations comprising:

receiving, via the open communications channel with the wearable client device, a notification indicating the wearable client device is within a threshold proximity of a first physical site of multiple physical sites, wherein a proximity sensor device is associated with the first physical site and includes a sensor identification tag;

matching the notification received from the wearable client device with an item of content including an identification of the item of content;

using the item of content, querying the database system for first content objects, in response to the querying, the content provisioning system, receiving a first query response from the database system including the first content objects;

correlating the first content objects with a role of a user of the wearable client device corresponding to the user's authorization access to data included in the first content objects, the role and authorization access being a part of a user profile information associated with the user, and in accordance therewith, curating the first content objects to obtain a first curated content by associating the first content objects with the role and authorization access of the user; and pushing, using an electronic communications module operable to maintain the open communications channel between the server computer and the wearable client device, the first curated content to the wearable client device relevant to the first physical site and identified based on the role and authorization access of the user thereby providing relevant content to the wearable client device with authorized access to the relevant content by the user.

11. The system of claim 10 wherein the electronic communications module comprises a Web Socket operable to maintain an open bi-directional communications channel with the wearable client device.

12. The system of claim 10 wherein the operations further comprise:

listening for content requests from the wearable client device over the second communications channel;

receiving a request from the wearable client device for one or more second content objects via the second communications channel;

communicating a second query to the database system to obtain the requested second content objects;

receiving a second query response from the database system including the second content objects;

correlating the second content objects with the user profile information of the user of the wearable client device to obtain second curated content; and communicating a response to the request from the wearable client device including the second curated content via the second communications channel.

13. The system of claim 10 wherein the operations further comprise:

receiving an update to the item of content corresponding to one or more updated content objects from a content provider application;

storing the one or more updated content objects in the database system, and pushing the one or more updated content objects to the wearable client device via the open communications channel.

14. The system of claim 10 wherein a wearable client application on the wearable client device is operable to detect when the wearable client device is within the threshold proximity of the proximity sensor device, and to communicate the notification to the server computer.

15. The system of claim 14 wherein the notification indicating the wearable client device is within the threshold proximity of the first physical site comprises a token sent to the server computer from a wearable client application on the wearable client device.

16. The system of claim 10 wherein the proximity sensor device is configured to detect when the wearable client device is within the threshold proximity of the proximity sensor device, and to communicate the notification to the server computer.

17. The system of claim 16 wherein the notification indicating the wearable client device is within the threshold proximity of the first physical site comprises the sensor identification tag sent to the server computer from the proximity sensor device.

18. A non-transitory computer readable storage medium tangibly embodying computer code, which when executed by a server computer, causes the server computer to perform operations comprising:

detecting a location of a wearable client device within a threshold proximity of a proximity sensor device of a first physical site of multiple physical sites, the proximity sensor device having a sensor identification tag to identify location of the proximity sensor device;

after the detecting step, a content provisioning system receiving, via an open communications channel between the content provisioning system and the wearable client device, a notification, either from the wearable client device, in the form of a token, or from the proximity sensor device, in the form of the identification tag, and based on the notification, identifying the location of the wearable client device relative to the location of the first physical, the content provisioning system including a database system and a server computer;

matching the received notification with an item of content including an identification of the item of content;

querying the database system based on the identification of the item of content;

in response to the querying, the content provisioning system receiving a first query response from the database system including first content objects;

correlating the first content objects with a role of a user of the wearable client device corresponding to the user's authorization access to data included in the first content objects, the role and authorization access being a part of a user profile information associated with the user, and in accordance therewith, curating the first content objects to obtain a first curated content by associating the first content objects with the role and authorization access of the user; and pushing, using an electronic communications module operable to maintain the open communications channel between the server computer and the wearable client device, the first curated content to the wearable client device relevant to the first physical site and identified based on the role and authorization access of the user thereby providing relevant content to the wearable client device with authorized access to the relevant content by the user.

19. The computer readable medium of claim 18 wherein the operations further comprise:

listening, by the server computer, for content requests from the wearable client device over the second communications channel separate from the open communications channel with the wearable client device;

receiving a request from the wearable client device for one or more second content objects via the second communications channel;

communicating a second query to the database system to obtain the requested second content objects;

receiving a second query response from the database system including the second content objects;

correlating the second content objects with the user profile information of the user of the wearable client device to obtain second curated content; and the content provisioning system communicating a response to the request from the wearable client device including the second curated content via the second communications channel.

20. The computer readable medium of claim 18 wherein the operations further comprise:

receiving an update to the item of content comprising one or more updated content objects from a content provider application;

storing the updated content objects in the database system, and pushing the updated content objects to the wearable client device via the open communications channel.

* * * * *